Sept. 18, 1928.  1,684,971
T. W. ROSHOLT ET AL
MEASURING APPARATUS FOR PAVING MACHINES
Filed Oct. 31, 1927  3 Sheets-Sheet 1

INVENTORS.
T. W. ROSHOLT.
HAROLD CEDERSTROM
BY THEIR ATTORNEYS.
Williamson Reich Williamson Sept. 18, 1928.  
T. W. ROSHOLT ET AL  
1,684,971  
MEASURING APPARATUS FOR PAVING MACHINES  
Filed Oct. 31, 1927   3 Sheets-Sheet 2
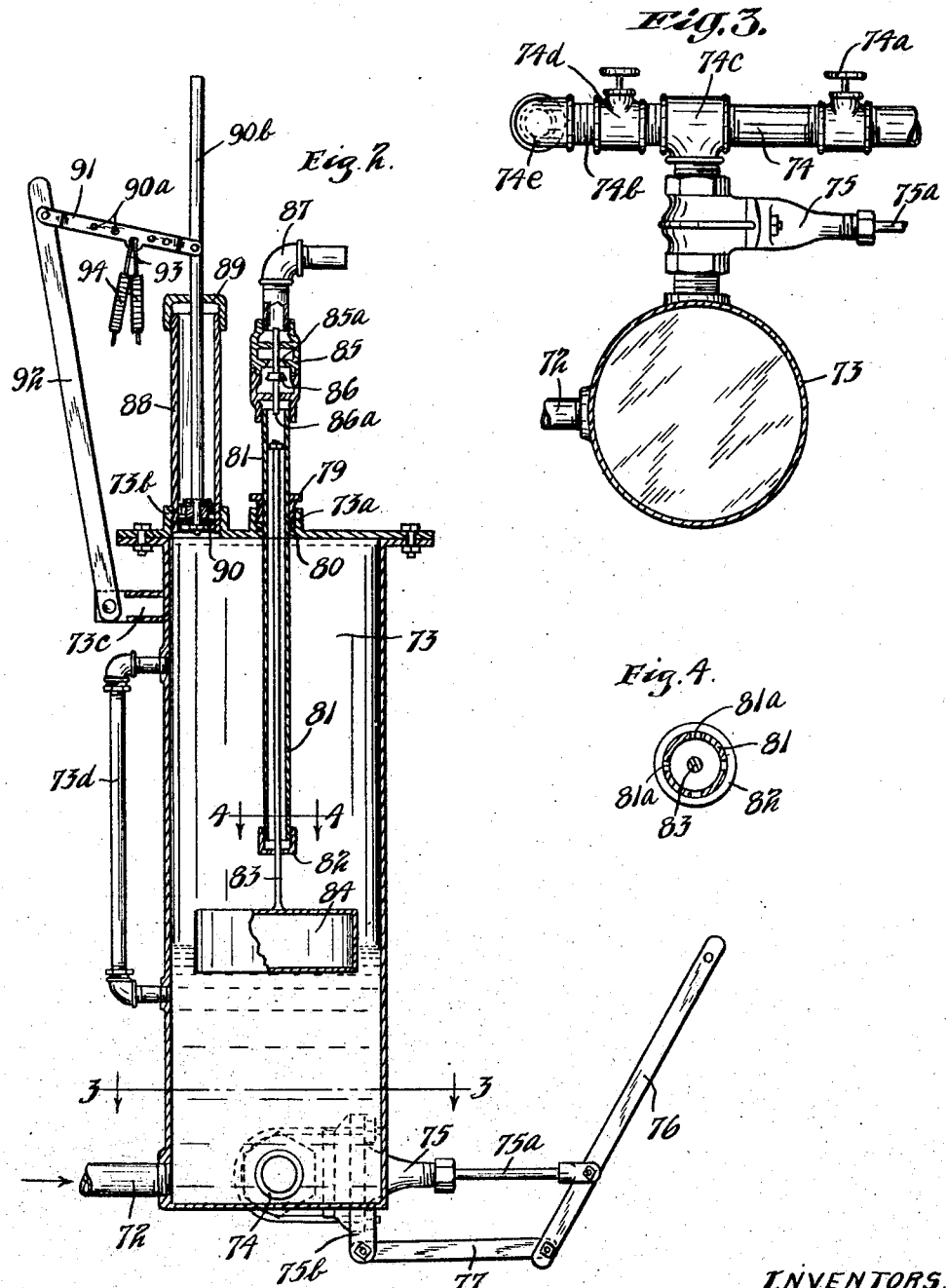
INVENTORS.
W. T. ROSHOLT.
HAROLD CEDERSTROM.
BY THEIR ATTORNEYS Sept. 18, 1928.
T. W. ROSHOLT ET AL
1,684,971
MEASURING APPARATUS FOR PAVING MACHINES
Filed Oct. 31, 1927   3 Sheets-Sheet 3
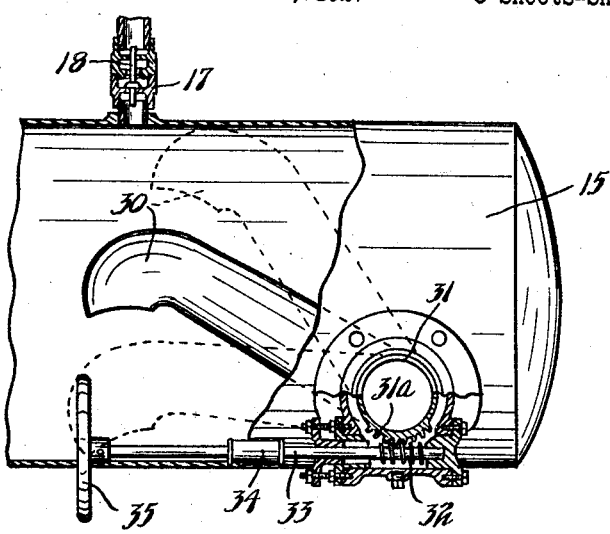
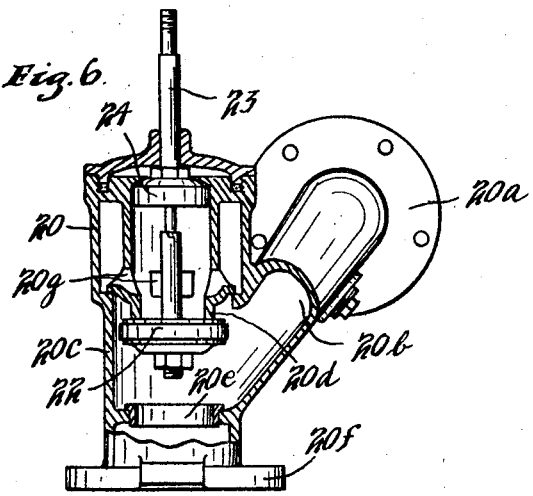
INVENTORS.
T. W. ROSHOLT.
HAROLD CEDERSTROM.
BY THEIR ATTORNEYS.
Williamson Reif & Williamson Patented Sept. 18, 1928.

1,684,971

UNITED STATES PATENT OFFICE.

THORMAN W. ROSHOLT AND HAROLD CEDERSTROM, OF MINNEAPOLIS, MINNESOTA, ASSIGNORS TO THORMAN W. ROSHOLT COMPANY, OF MINNEAPOLIS, MINNESOTA, A CORPORATION OF MINNESOTA.

MEASURING APPARATUS FOR PAVING MACHINES.

Application filed October 31, 1927. Serial No. 230,061.

This invention relates to a concrete mixer, and particularly to the combination of a concrete mixer and a measuring device for a chemical solution to be used with said concrete. As is well known, concrete mixers are now commonly used in mixing concrete for roads, buildings, and other work. It is desirable, in some cases, to have a chemical mixed with the concrete in order to get a quicker setting thereof, and one chemical which is now commonly so used is calcium chloride. It is important that the proper amount of this solution be mixed with the concrete in order to have the desired effect and it is therefore desirable to have a mechanism which will insure that the proper amount of the solution is taken from the supply and that this is properly mixed with the other parts of the concrete.

It is an object of this invention, therefore, to provide a concrete mixing machine having a mixing member, means for charging the concrete forming materials thereinto, a control means for said last mentioned means, together with a measuring device adapted to receive a definite amount of the chemical solution, means connected to said control means operated when said definite amount of solution has been received in said measuring device, and means for charging said solution from said measuring device into said mixing member.

It is a further object of the invention to provide a concrete mixer having a member in which the solid material and water are mixed, a supply for a chemical solution, a measuring vessel, means for charging said chemical solution into said measuring vessel, and means connected with said vessel for rendering inoperative said last mentioned means when a certain definite portion of the solution is charged into said vessel.

It is also an object of the invention to provide a concrete mixer having a member in which the concrete is mixed, a skip for delivering the solid materials to said member, a supply for a chemical solution, a measuring vessel, means for charging said solution into said vessel, a control means for said skip, and means connected with said vessel for rendering said control means operative, so that said skip can discharge into said mixing member when a certain definite amount of the solution is charged into said vessel.

It is still another object of the invention to provide a concrete mixing device having a member in which the solid material and water are mixed, a skip for delivering the solid material to said member, a supply of chemical solution, a measuring vessel, a control means for said skip, means for charging said solution into said vessel and means connected with said vessel for rendering inoperative said last mention means, and for rendering operative said control means whereby said skip may charge material into said mixing member when a certain definite amount of said solution has been charged into said vessel.

These and other objects and advantages of the invention will be fully set forth in the following description made in connection with the accompanying drawings, in which like reference characters refer to similar parts throughout the several views and in which:—

Fig. 2 is a view mostly in vertical section and partly in side elevation showing a mixing vessel used;

Fig. 3 is a horizontal section taken on line 3—3 of Fig. 2;

Fig. 4 is a horizontal section taken on line 4—4 of Fig. 2;

Fig. 5 is a view partly in side elevation and partly in vertical section of the water supply tank; and Fig. 6 is a view partly in side elevation and partly in vertical section of the three-way valve used.

Figure 1:
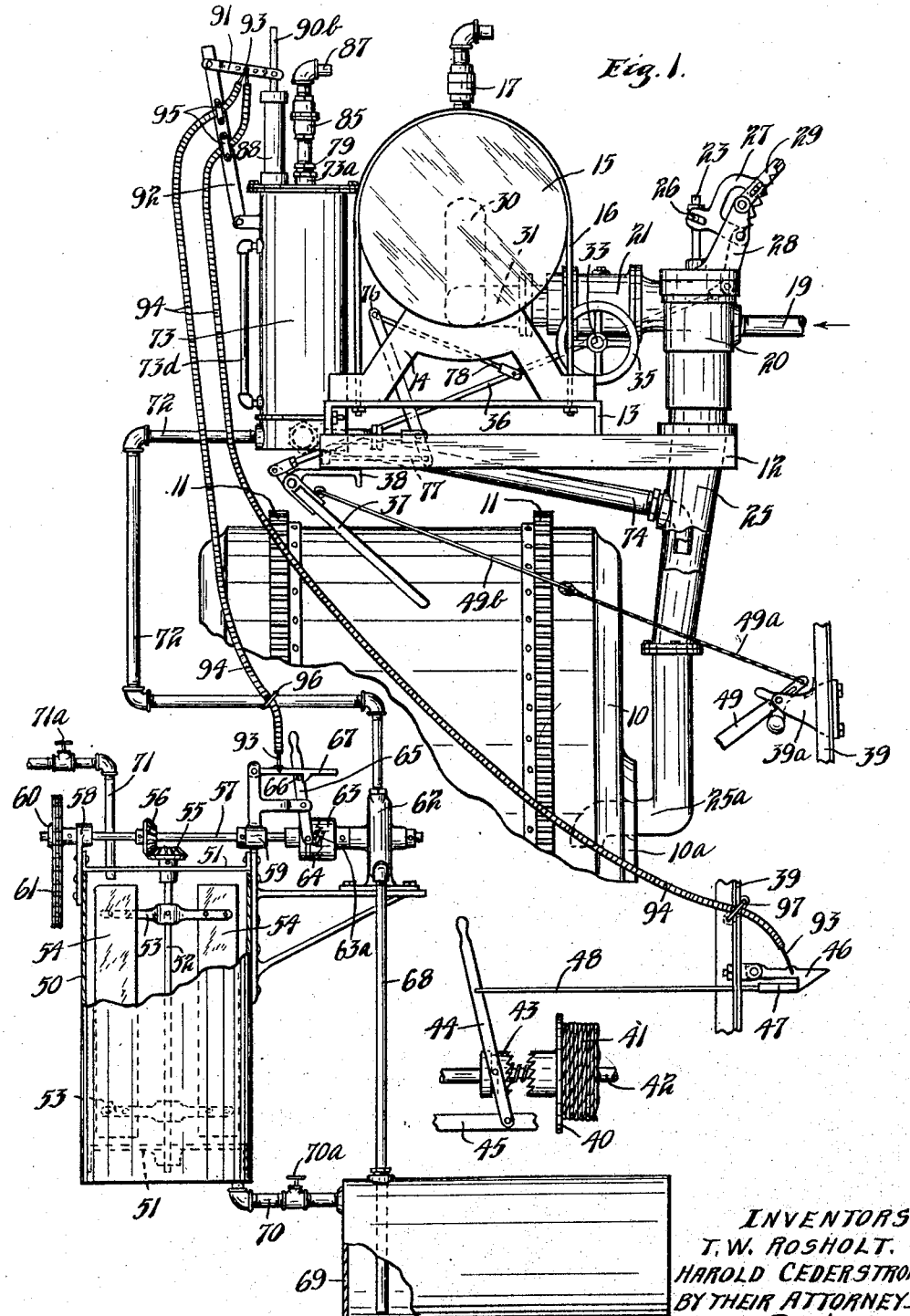
Fig. 1 is a view in side elevation showing a portion of a concrete mixer with the invention applied thereto, certain parts being broken away and other parts shown in vertical section.

Referring to the drawings, particularly Fig. 1, a portion of a concrete mixer such as now commonly used for mixing concrete for buildings or roads is shown, which will comprise a frame (not shown) on which is mounted a mixing drum 10. The drum 10 is mounted for rotation and the same is shown as having a pair of annular gears 11 secured thereto adapted to mesh with a driven gear for rotating said drum. The drum 10 has a central boss 10$^a$ with a circular opening therein through which the water and aggregate material such as sand, broken stone, or gravel is charged into said drum for mixing. A platform 12 is shown as supported above the drum 10 on which is disposed an auxiliary frame 13 carrying the blocks or brackets 14 which support a water supply tank 15. This tank is secured to the support 13 in members 11 by spaced U-shaped rods 16 extending thereover and connected to said frame 13 by nuts threaded on the ends thereof. The tank 15 is shown as having a vent outlet pipe 17 having a check valve 18 therein forming a water seal when the tank is pumped full of water. The tank 15 is adapted to be filled by a supply pipe 19 which passes through a three-way valve 20. This valve is shown in Fig. 6 and comprises a flange $20^a$ adapted to be secured to a casing 21 secured to tank 15. A conduit $20^b$ leads from the flange $20^a$ into the cylindrical portion $20^c$ of valve 20, which portion has therein spaced seats $20^d$ and $20^e$ with which a plunger or piston 22 is adapted alternately to contact. The plunger 22 has a plunger rod 23 connected thereto, projecting out of the top of casing 20 and having secured thereto a guiding plunger 24. The valve 20 has a flange $20^f$ secured on platform 12, from which extends downwardly a conduit 25. The conduit $25^a$ is connected to conduit 25 and has its end bent to extend into the member 10. The plunger 23 has a pin 26 projecting laterally therefrom, embraced by a slot in an oscillating bracket 27 mounted on valve 20, which bracket is adapted to be moved to two positions by an arm 28 and be held in such positions by a pawl member 29. When bracket 27 is in the position shown, the plunger 22 is in engagement with the valve seat $20^d$ as shown in Fig. 6, and at this time water can flow through the conduit $20^b$ and downwardly through the bottom of the valve. When bracket 27 is in its other position, the plunger 22 will be in engagement with valve seat $20^e$ and water may then pass into the valve 20 through the opening $20^g$ therein and into and through conduit $20^b$ and flange $20^a$. Such water will pass through casing 21 and through the pipe or spout 30 disposed within the tank, which spout is revoluble with a pipe or sleeve 31 extending into the casing 21 and having gear teeth $31^a$ at one side thereof which are engaged by the worm gear 32 carried on a shaft 33 mounted in casing 21 and bearings 34 and having an operating hand wheel 35 at one end thereof. The spout 30 is movable to different positions in tank 15 as indicated in dotted lines in Fig. 5. The arm 28 is moved by the rod or link 36 pivoted thereto, the other end of which link is connected to the short arm of the hand lever 37 pivoted to a bracket 38 secured to platform 12. A skip or scoop (not shown) is adapted to be moved upwardly in guides 39 to carry the sand and gravel and dump the same into the member 10. An operating drum 40 having a cable 41 adapted to be wound thereon, is provided for operating said skip, and said drum is adapted to be connected to its operating shaft 42 to operate the skip by a clutch member 43 movable by a lever 44 pivoted to a portion 45 of the frame. The structure so far described is that heretofore used in concrete mixers and forms no part of the present invention. In accordance with the present invention, the operation of said lever is controlled by a dog 46 pivoted to frame 39 through a stop member 47 connected to lever 44 by the rod 48. When stop 47 engages the dog 46 the skip cannot be operated, but when dog 46 is lifted, lever 44 can be actuated to operate the skip.

The frame 39 has a bracket $39^a$ secured thereto, to which is pivoted a trip member 49 connected by a cable $49^a$ and rod $49^b$ to the lever 37. The trip member 49 is adapted to be engaged by the skip to swing the lever 37 to the position shown in Fig. 1.

A tank 50 is provided, having bars 51 extending thereacross, carrying bearings in which is journaled a shaft 52. The shaft 52 has mounted thereon the arms 53 which have secured at their outer ends the mixing paddles 54. The shaft 52 has secured thereto at its top end a beveled gear 55 with which meshes another beveled gear 56 secured to a shaft 57 journaled in bearings 58 and 59 formed in brackets bolted to the sides of the tank 50. The shaft 57 has a sprocket wheel 60 secured to one end driven by a chain 61 from a suitable driven sprocket on the machine. A pump 62 is shown, mounted on an arm of the bracket 59, which pump is driven by the shaft 57 which extends thereto. The rotating element of the pump carries the half-clutch 63 adapted to be engaged by another half-clutch 64 movable on and secured to shaft 57 which is moved into engagement with member 63 by a lever 65 pivoted to an arm of the bracket 59. A compression spring $63^a$ is disposed between members 63 and 64, normally tending to separate the same. The lever 65 has a pin 66 disposed therein adapted to be engaged by a pivoted pawl 67 also connected to an arm of bracket 59 as shown in Fig. 1. The pump 62 has an intake pipe 68 extending to adjacent the bottom of the tank 69, which tank is connected to the bottom of tank 50 by a pipe 70 having a controlling valve $70^a$ therein. A supply pipe 71 is provided for the tank 50, shown as having a controlling valve $71^a$ therein. The pump 62 has an outlet or discharge pipe 72 extending to the bottom of the vessel 73 shown in the form of a vertical cylindrical tank which is carried on the platform 12. The vessel 73 has a discharge pipe 74 connected to one side thereof, the end of which extends into and discharges into the conduit 25, as shown in Fig. 1. The pipe 74 has a valve 75 therein of the slide type, which is moved to open and closed position by a rod 75ª connected to an operating lever 76, the lower end of which is pivoted to a link 77, in turn connected to a downwardly extending lug 75ᵇ on the casing of the valve 75. The pipe 74 has a shut-off valve 74ª therein and another pipe 74ᵇ is connected to pipe 74ª by the T member 74ᶜ, which pipe 74ᵇ has a shut-off valve 74ᵈ therein, from which extends a pipe 74ᵉ having a downwardly directed end. A link 78 pivotally connects the end of lever 76 and an intermediate portion of the link 36. The tank 73 has a top thereon with a central hub 73ª projecting upwardly therefrom, forming a box for a stuffing gland 79 adapted to comprise the packing 80 about a tube 81 extending therethrough and into the tank 73, which tube is provided with a plurality of circumferentially spaced holes 81ª adjacent its lower end and has secured to said end a cap 82. The cap 82 is bored to receive a rod 83 carrying a float 84, which rod extents upwardly through tube 81 and is shown as having a nut secured to its upper end forming a guide in tube 81. The top of tube 81 carries a valve casing 85 having a valve seat 85ª therein with which co-operates a vertically movable valve 86 having guiding stems 86ª at each side thereof, slidable in partitions in casing 85. An open-ended pipe 87 is secured to the top of valve casing 85 and shown as having its end projecting horizontally. A tube 73ᵈ preferably of glass is connected along the side of tank 73 having its ends extending thereinto at spaced points, said tube forming a sight tube. The top of tank 73 also has a projecting hub 73ᵇ in which is secured a cylindrical member 88 having a cap 89 secured to its upper end. The bottom of cylinder 88 communicates with tank 73 and a piston 90 is slidable in member 88 and has a piston rod 90ª connected thereto slidable through cap 89. The rod 90 has pivotally connected thereto the bifurcated end of a bar 91, the other bifurcated end of which is connected to a bar 92 extending downwardly and inwardly and connected at its lower end between the sides of a lug 73ᶜ projecting from the side of the member 73. The bar 91 has a plurality of holes 91ª therein, any one of which is adapted to receive the upper ends of a pair of flexible rods or wires 93 adapted to pass through casings 94, one of which rods or wires is connected to the dog 67 and the other of which is connected to the dog 46. The casings 94 are held in clips 95 on the bar 92, and one of the same is also held in the clip 96 secured to pipe 72. The other casing 94 is held in a clip 97 secured to one side of the frame 39.

In operation the member 10 will be rotated and the skip referred to will, at certain periods, travel up and discharge the sand and gravel into said member. As the skip rises, it engages the member 49 and swings lever 37 to the position shown in Fig. 1, thus swinging the link 36 and the valve 20 to the open position such as shown in Figs. 1 and 6. The tank 15 is filled with water when the plunger 22 and valve 20 is in engagement with seat 20ª, and the amount of water which is discharged from the tank 15 for each batch of concrete in member 10 is determined by the position of spout 30. This spout can be adjusted by the hand wheel 35 and it will be seen that the water will run out of the tank 15 to the level of the mouth of spout 30. The chemical solution used, such as calcium chloride, is mixed with the tank 50, water being supplied to said tank as desired by the pipe 71. The mixed solution is then run into tank 69 and is ready to be pumped into the measuring vessel 73. Between each batch of materials mixed in the member 10, the operator will move lever 65 to engage the clutch members 63 and 64 and the dog 67 will drop over pin 66 and hold the clutch in engaged position. The solution enters vessel 73 and the member 81 will be adjusted to admit the desired amount of said solution. The solution rises until it engages float 84 and said float is then raised in said solution, moving rod 83 upward until the same engages the lower stem 86ª of valve 86. Said valve is moved against its seat 85ª and the further exit of air from vessel 73 is then prevented. As the solution continues to be pumped into the vessel 73, the air above the solution is compressed. When this pressure reaches a certain point, the plunger 90 is moved upward in member 88, thus swinging bar 91 upwardly. As bar 91 moves upwardly, the wires or rods 93 are lifted. One of these is connected to the dog 67 and said dog is then raised. Spring 63ª then forces the clutch members 63 and 64 apart and said clutch is disengaged and the operation of pump 62 discontinued. The desired amount of the solution is then contained in the vessel 73. When the other member 93 is moved upward, the dog 46 is disengaged from stop member 47 and the operator can then actuate the control lever 44 for operating the skip. The skip in rising engages member 49 and swings lever 37 to the position shown in Fig. 1. This lever 37 has previously been swung to the left of the position shown in Fig. 1 by the operator. When lever 37 is swung to the position shown in Fig 1, link 36 is moved to open the valve 20 or to bring it to the position shown in Fig. 6 so that a charge of water can run out of tank 15 through casing 21, valve 20 and conduits 25 and 25ª, into the member 10. At the same time, through the links 78 the lever 76 is actuated to open the valve 75 so that the solution in vessel 73 may discharge through the pipe 74, and into the conduit 75. The water from tank 15 will ordinarily have reached the conduit 25 before the solution is emptied therein from the pipe 74. The materials for the batch of concrete are now all in the member 10 and the same are mixed as usual by the revolution of said member. After the batch is discharged into member 10, the operator will manually swing the lever 37 to the left as shown in Fig. 1, so that the piston 22 and valve 20 will be moved into engagement with seat 20ᵉ and water will then pass from supply pipe 19 through said valve casing 21 and spout 30 to again fill the tank 15. The valve 75 will again be closed and the apparatus will be in position to receive and mix the necessary batch of material.

It is desirable at times to check the measuring vessel 73 and in some states the highway department requires that the measuring vessel be checked. In applicants' structure this can be done by closing valve 74ᵃ in pipe 74 and opening valve 74ᵈ. The material can then be run out of vessel 73 through the pipe 74. In this manner the amount of the solution in the tank 73 can be checked.

From the above description it is seen that applicants have provided a concrete mixing machine having in combination therewith a measuring device for a chemical solution, by means of which a very accurate amount of said solution can be used with each batch of concrete, and this amount may be varied as desired. Furthermore, the machine is so constructed that careless operators cannot mix the batch before the desired amount of the solution is measured off and ready to be discharged into the mixing member. A correctly proportioned batch of materials is thus assured. The device is quite simple and can be readily added to the standard concrete mixing machines. The device has been amply demonstrated in actual practice and found to be very successful and efficient, and the same is being used in road building work.

It will, of course, be understood that various changes may be made in the form, details, arrangement and proportions of the parts, without departing from the scope of applicants' invention, which, generally stated, consists in a device capable of carrying out the objects above set forth, in the novel parts and combinations of parts disclosed and defined in the appended claims.

What is claimed is:—

1. The combination with a concrete mixer comprising a mixing member, a water supply means and means for charging water and aggregate materials thereinto, of a control means for said last mentioned means, a supply means for a chemical solution, a measuring device for apportioning a definite quantity of said solution, means connected to said control means for actuating the same when said quantity of said solution has been apportioned, and means for discharging said quantity of the solution from said device into said member.

2. The combination with a concrete mixer comprising a mixing member, means for supplying and discharging water therein, and means for discharging the solid materials thereinto, of a supply means for a chemical solution, a measuring vessel, means for charging said solution into said vessel, means connected to said vessel for rendering said last mentioned means inoperative when a certain amount of said solution has been charged into said vessel, and means for discharging said solution from said vessel into said mixing member substantially simultaneously with the discharge of said water thereinto.

3. The combination with a concrete mixer comprising a mixing member, a water supply means, means for discharging water thereinto, and means for discharging the solid materials thereinto, of a supply means for a chemical solution, a measuring vessel, means for charging said solution into said vessel, a control means for said second mentioned means, means connected with said vessel for rendering said control means operative so that said second mentioned means may be operated when a certain amount of said solution has been charged into said vessel.

4. The combination with a concrete mixer comprising a mixing member, means for supplying and discharging water thereinto, and a skip for charging the solid materials thereinto, of a supply means for a chemical solution, a measuring vessel for apportioning a definite quantity of said solution, a control means for said skip, means for charging said solution into said measuring vessel, means connected with said vessel for rendering said last mentioned means inoperative and rendering said control means operative when a certain amount of solution has been charged into said vessel.

5. The combination with a concrete mixer comprising a mixing member, means for discharging water thereinto, and means for discharging the solid materials thereinto, of a supply means for a chemical solution, a measuring vessel adapted to receive a definite quantity of said solution, means for discharging said solution from said vessel into said mixing member, and a common means for operating said last mentioned means and said first mentioned means.

6. The structure set forth in claim 5, and a trip member adapted to be actuated by said second mentioned means for operating said last mentioned means.

7. The combination with a concrete mixer comprising a mixing member, means for charging water thereinto, a skip for charging the solid materials thereinto, a control means for said first mentioned means, a supply means for a chemical solution, a measuring device for receiving a definite quantity of said solution, means for discharging said solution into said mixing member, a control means for said last mentioned means, a common operating member for said two control means, and an actuating member for said common operating means and a trip member adapted to be operated by said skip when moving in one direction to move said actuating member in one direction.

8. The combination with a concrete mixer comprising a mixing member, means for charging water thereinto, a skip for charging the solid materials thereinto, a control means for said skip, a locking member for said control means preventing operation thereof, a supply means for a chemical solution, a measuring vessel for receiving a definite amount of said solution, means for charging said solution into said measuring vessel, and means connected with said vessel adapted to be operated when a certain quantity of the solution is received in said vessel, to release said locking member, whereby said skip may be operated.

9. The combination of a concrete mixer comprising a mixing member in which the water and solid materials are mixed, a supply means for a chemical solution, a measuring vessel for said solution, a pump for charging said solution into said vessel, a pump operating means, a movable member connected to said vessel adapted to be moved when a certain amount of solution has been charged into said vessel, and means connected to said member for rendering said pump operating means inoperative when a certain amount of liquid has been received in said vessel.

10. The combination with a concrete mixer comprising a mixing member in which the water and solid materials are mixed, a supply means for a chemical solution, a measuring vessel for receiving said solution, means for charging said solution into said measuring vessel, a float in said measuring vessel, a valve carried by said measuring vessel adapted to be closed by said float when the latter is raised by the solution in said vessel, to shut off the exit of air from said vessel, a plunger connected to said vessel movable by the force of the compressed air therein, a means connected to said plunger and operated thereby for rendering said last mentioned means inoperative when a certain definite quantity of liquid has been charged into said vessel.

11. The combination with a concrete mixer comprising a mixing member, means for charging concrete forming material into said member, a supply means for a chemical solution, a measuring means for said solution, an actuating means for said first mentioned means, and means operated when a certain amount of solution has been measured by said measuring means for rendering said actuating means operative.

12. The combination with a concrete mixer comprising a mixing member in which the water and solid materials are mixed, a supply means for a chemical solution, a measuring vessel for receiving said solution, means for charging said solution into said measuring vessel, means for shutting off the exit of air in said vessel after a certain amount of said solution has been charged thereinto, means operated by the pressure of air in said vessel, and means operated by said last mentioned means for rendering inoperative said means for charging the solution into said vessel when a certain definite amount of said solution has been charged thereinto.

13. The combination with a concrete mixer comprising a mixing member, a water container and means for charging the concrete forming materials thereinto, of a supply means for a chemical solution, a measuring device for operating a definite quantity of said solution, a conduit connecting said measuring device and said mixing member for discharging said solution into said mixing member, means for closing said conduit and a valve controlled drain conduit leading from said measuring device.

14. An apparatus of the class described, comprising a liquid receiving vessel, a float movable in said vessel, a valve in said vessel adapted to be closed by said float when the latter is raised by liquid in said vessel, a plunger connected to said vessel and adapted to move by the pressure of air in said vessel after said valve is closed, and an operating lever connected to said plunger adapted to have operating connections attached thereto.

15. The combination with a concrete mixer comprising a mixing member, a skip for charging aggregate materials thereinto, a water supply tank, means for discharging water into said mixer, a control means for said last mentioned means, a supply means for a chemical solution, a container into which said solution is charged, and movable means moved by the solution in said container when a certain amount has been charged thereinto for actuating said control means and for discharging said solution from said container into said mixer.

In testimony whereof we affix our signatures.

THORMAN W. ROSHOLT.
HAROLD CEDERSTROM.